US008701339B1

(12) United States Patent
Walsh

(10) Patent No.: US 8,701,339 B1
(45) Date of Patent: Apr. 22, 2014

(54) VACUUM-BASED PEST CAPTURE CONTAINER

(76) Inventor: Norman Walsh, Kingston, WA (US)

( * ) Notice: Subject to any disclaimer, the term of this patent is extended or adjusted under 35 U.S.C. 154(b) by 235 days.

(21) Appl. No.: 13/313,477

(22) Filed: Dec. 7, 2011

Related U.S. Application Data

(63) Continuation-in-part of application No. 13/205,705, filed on Aug. 9, 2011.

(51) Int. Cl.
*A01M 1/06* (2006.01)

(52) U.S. Cl.
USPC .......................................................... 43/139

(58) Field of Classification Search
USPC .......................................................... 43/139
See application file for complete search history.

(56) References Cited

U.S. PATENT DOCUMENTS

| | | | | |
|---|---|---|---|---|
| 923,368 A * | 6/1909 | Myser | .............................. | 43/139 |
| 959,155 A * | 5/1910 | Nault | .............................. | 43/139 |
| 1,006,271 A * | 10/1911 | Powers | .......................... | 43/139 |
| 1,071,620 A * | 8/1913 | Kingsland | ...................... | 43/139 |
| 1,226,641 A * | 5/1917 | Cushing | ........................... | 43/60 |
| 1,302,160 A * | 4/1919 | Hedrich et al. | ................. | 43/131 |
| 1,348,449 A * | 8/1920 | Rodgers et al. | ................. | 43/81 |
| 2,655,759 A * | 10/1953 | Cronberger | ...................... | 43/60 |
| 2,992,770 A * | 7/1961 | Irving | .............................. | 43/139 |
| 3,750,327 A * | 8/1973 | Thybault | ......................... | 43/139 |
| 3,965,608 A * | 6/1976 | Schuman | ........................ | 43/139 |
| 4,062,142 A | 12/1977 | Marotti | | |
| 4,141,174 A * | 2/1979 | Smith | .............................. | 43/139 |
| 4,175,352 A * | 11/1979 | Catlett | ............................ | 43/139 |
| 4,400,904 A * | 8/1983 | Baker | .............................. | 43/131 |
| 4,566,218 A | 1/1986 | Kurosawa et al. | | |
| 4,625,453 A * | 12/1986 | Smith | .............................. | 43/139 |
| 4,683,673 A * | 8/1987 | Taylor | ............................. | 43/139 |
| 4,768,305 A * | 9/1988 | Sackett | ............................ | 43/61 |
| 4,979,327 A * | 12/1990 | Harris | .............................. | 43/61 |
| 4,979,330 A * | 12/1990 | Rorant | ............................ | 43/139 |
| 5,040,326 A * | 8/1991 | Van Dijnsen et al. | ........... | 43/139 |
| 5,175,957 A * | 1/1993 | West | ................................ | 43/61 |
| 5,175,960 A * | 1/1993 | Wade et al. | ..................... | 43/139 |
| 5,185,953 A | 2/1993 | Gross | | |
| 5,305,495 A * | 4/1994 | Nelsen et al. | .................... | 43/139 |
| 5,367,821 A * | 11/1994 | Ott | ................................... | 43/139 |
| 5,400,543 A * | 3/1995 | Ideker, Jr. | ........................ | 43/139 |
| 5,452,539 A * | 9/1995 | Kurosawa et al. | ................ | 43/58 |

(Continued)

FOREIGN PATENT DOCUMENTS

| EP | 129504 A1 * | 12/1984 | .............. | A01M 1/06 |
|---|---|---|---|---|
| EP | 1040756 A1 * | 10/2000 | .............. | A01M 1/06 |

(Continued)

*Primary Examiner* — Darren W Ark
(74) *Attorney, Agent, or Firm* — Kyle A. Fletcher, Esq.

(57) ABSTRACT

The vacuum-based pest capture container works in-line between an automated vacuum-based pest control system and an existing vacuum cleaner in order to detect a pest, operate the vacuum cleaner in order to generate a vacuum force capable of sucking said pest into the container for capture. The container includes an inlet opposite of an outlet, which enables fluid communication between the automated pest control system and a vacuum hose. The inlet features a one-way flap that opens inwardly upon reaction to a vacuum force generated by said vacuum; whereas the outlet includes a fixed screen so as to prevent a pest from traversing through the container. The container includes a removable lid to enable extraction of a caught pest from within. A handle shall be provided to enable articulation of the container as needed.

19 Claims, 7 Drawing Sheets

(56) References Cited

U.S. PATENT DOCUMENTS

| | | | | |
|---|---|---|---|---|
| 5,564,221 A | * | 10/1996 | Henriques | 43/61 |
| 5,720,125 A | * | 2/1998 | Oviatt | 43/61 |
| 5,809,688 A | * | 9/1998 | Wallen | 43/61 |
| 5,915,950 A | * | 6/1999 | Kleinhenz | 43/139 |
| 5,926,997 A | * | 7/1999 | Wilcox | 43/139 |
| 6,202,343 B1 | * | 3/2001 | Mah | 43/139 |
| 6,568,125 B2 | * | 5/2003 | Kleinhenz | 43/139 |
| 6,640,489 B1 | * | 11/2003 | Boulton | 43/139 |
| 6,865,843 B1 | * | 3/2005 | Jordan, Sr. | 43/139 |
| 6,901,694 B1 | * | 6/2005 | Neault et al. | 43/131 |
| 6,910,300 B1 | * | 6/2005 | Warren | 43/131 |
| 7,152,365 B2 | * | 12/2006 | Wyers | 43/139 |
| 7,404,269 B2 | * | 7/2008 | Collins | 43/139 |
| 7,565,764 B2 | * | 7/2009 | Collins | 43/139 |
| 7,805,882 B2 | * | 10/2010 | Wolf | 43/139 |
| 8,276,313 B2 | * | 10/2012 | Reime | 43/139 |
| 2004/0088903 A1 | * | 5/2004 | Poche | 43/61 |
| 2005/0028428 A1 | * | 2/2005 | Wills | 43/60 |
| 2005/0246945 A1 | * | 11/2005 | Evink | 43/139 |

FOREIGN PATENT DOCUMENTS

| | | | | | |
|---|---|---|---|---|---|
| GB | 2450997 A | * | 1/2009 | | A01M 1/06 |
| JP | 11028041 A | * | 2/1999 | | A01M 1/06 |
| JP | 11103747 A | * | 4/1999 | | A01M 1/08 |
| JP | 2003169583 A | * | 6/2003 | | A01M 1/06 |
| JP | 2003235427 A | * | 8/2003 | | A01M 1/06 |
| JP | 2004041130 A | * | 2/2004 | | A01M 1/06 |
| JP | 2008263875 A | * | 11/2008 | | A01M 1/06 |

* cited by examiner

VACUUM-BASED PEST CAPTURE CONTAINER

CROSS REFERENCES TO RELATED APPLICATIONS

This application is a continuation-in part of application Ser. No. 13/205,705, which was filed on Aug. 9, 2011.

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of mouse traps and pest control, more specifically, a pest control system and container that employs the use of a vacuum to trap pests within said container for subsequent disposal.

B. Discussion of the Prior Art

As will be discussed immediately below, no prior art discloses a vacuum-based pest capture container that works in conjunction with an automated pest control system for use with an existing vacuum cleaner; wherein the pest capture container is in fluid communication with a vacuum hose and the automated pest control system; wherein the container includes an inlet having a one-way flap that opens inwardly upon a vacuum formed via a vacuum hose located adjacent to an outlet provided distally on said container; wherein the outlet includes a fixed screen so as to prevent a pest from passing through the container and down the vacuum hose towards a vacuum; wherein the container includes a removable lid and a handle; wherein the container may be of clear construction so as to enable visualization of any contents contained therein.

The Jordan, Sr. patent (U.S. Pat. No. 6,865,843) discloses a portable electric mouse trap in the shape of a cat; wherein the device includes a collection chamber, a motion sensor, a retractable gate, and a vacuum device. However, the portable electric mouse trap is not a pest control and capture container system that can attach to and operate an existing shop-styled vacuum so as not to require a vacuum within the mouse trap.

The Kurosawa et al. patent (U.S. Pat. No. 5,452,539) discloses an apparatus for trapping rats with an air flow duct. However, the apparatus is not simply a pest trap and capturing container that works in-line an existing shop-styled vacuum and an automated pest control system in order to collect pests therein.

The Gross patent (U.S. Pat. No. 5,185,953) discloses a rodent trap with a launching mechanism for ejecting a rodent through an opening in the top of a housing. However, the rodent trap does not work with and control an existing vacuum to trap a rodent upon detection by a sensing means located in a tube that connects with the vacuum hose, and including a container for capture of said pest in-line between the vacuum hose and the pest control system.

The Van Dijnsen et al. patent (U.S. Pat. No. 5,040,326) discloses a system for detecting and capturing pest, such as mice and rats, by a suction unit. Again, the system is not adapted for use with an existing vacuum and of which detects the presence of a pest before operating a vacuum cleaner to vacuum out the pest and into a container for capturing said pest therein.

The Kurosawa et al. patent (U.S. Pat. No. 4,566,218) discloses an apparatus for automatically trapping and processing rats whereby the device includes a collection tube and a suction unit, and wherein the rat is killed by gas in the collection tube. However, the apparatus does not include a container that is placed in-line between an automated pest control system and an existing vacuum cleaner, and is dedicated to killing the caught pest as opposed to trapping for subsequent release.

The Marotti patent (U.S. Pat. No. 4,062,142) discloses a trapping and killing apparatus for mice and other animals. Again, the apparatus is not a container located in-line between an existing vacuum cleaner and an automated pest control system, and upon sensing to the presence of a pest, shall operate the vacuum so as to trap said pest within the container.

The Wills patent Application Publication (U.S. Pub. No. 2005/0028428) discloses a vacuum motor that draws rats into a conduit system. Again, the asystem is not a container located in-line between an existing vacuum cleaner and an automated pest control system, and upon sensing to the presence of a pest, shall operate the vacuum so as to trap said pest within the container.

The Oviatt patent (U.S. Pat. No. 5,720,125) disclosbs a disposable mouse trap that includes a plastic tube and ping pong ball. However, the mouse trap does not work with an existing vacuum cleaner and include a container that captures a pest therein and is fitted in between the vacuum hose and an automated pest control system.

While the above-described devices fulfill their respective and particular objects and requirements, they do not describe a vacuum-based pest capture container that works in conjunction with an automated pest control system for use with an existing vacuum cleaner; wherein the pest capture container is in fluid communication with a vacuum hose and the automated pest control system; wherein the container includes an inlet having a one-way flap that opens inwardly upon a vacuum formed via a vacuum hose located adjacent to an outlet provided distally on said container; wherein the outlet includes a fixed screen so as to prevent a pest from passing through the container and down the vacuum hose towards a vacuum; wherein the container includes a removable lid and a handle; wherein the container may be of clear construction so as to enable visualization of any contents contained therein. In this regard, the vacuum-based pest capture container departs from the conventional concepts and designs of the prior art.

SUMMARY OF THE INVENTION

The vacuum-based pest capture container works in-line between an automated vacuum-based pest control system and an existing vacuum cleaner in order to detect a pest, operate the vacuum cleaner in order to generate a vacuum force capable of sucking said pest into the container for capture. The container includes an inlet opposite of an outlet, which enables fluid communication between the automated pest control system and a vacuum hose. The inlet features a one-way flap that opens inwardly upon reaction to a vacuum force generated by said vacuum; whereas the outlet includes a fixed screen so as to prevent a pest from traversing through the container. The container includes a removable lid to enable extraction of a caught pest from within. A handle shall be provided to enable articulation of the container as needed.

The container may be of clear construction so as to provide for visualization of the contents captured within.

An object of the invention is to provide a container that works in-line between an automated pest control system and an existing vacuum cleaner.

An even further object of the invention is to enable a fluid communication between the automated pest control system and the vacuum cleaner.

A further object of the invention is to provide a one-way flap that opens in direct response to a vacuum force generated by the vacuum cleaner, and which enables a pest to pass through the inlet and into the container.

Another object of the invention is to provide a fixed screen on the outlet side of the container, which will prevent pests from crossing through the container when the vacuum force is generated.

These together with additional objects, features and advantages of the automated vacuum-based pest control system will be readily apparent to those of ordinary skill in the art upon reading the following detailed description of presently preferred, but nonetheless illustrative, embodiments of the automated vacuum-based pest control system when taken in conjunction with the accompanying drawings.

In this respect, before explaining the current embodiments of the automated vacuum-based pest control system in detail, it is to be understood that the automated vacuum-based pest control system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated vacuum-based pest control system.

It is therefore important that the claims be regarded as including such equivalent construction insofar as they do not depart from the spirit and scope of the automated vacuum-based pest control system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
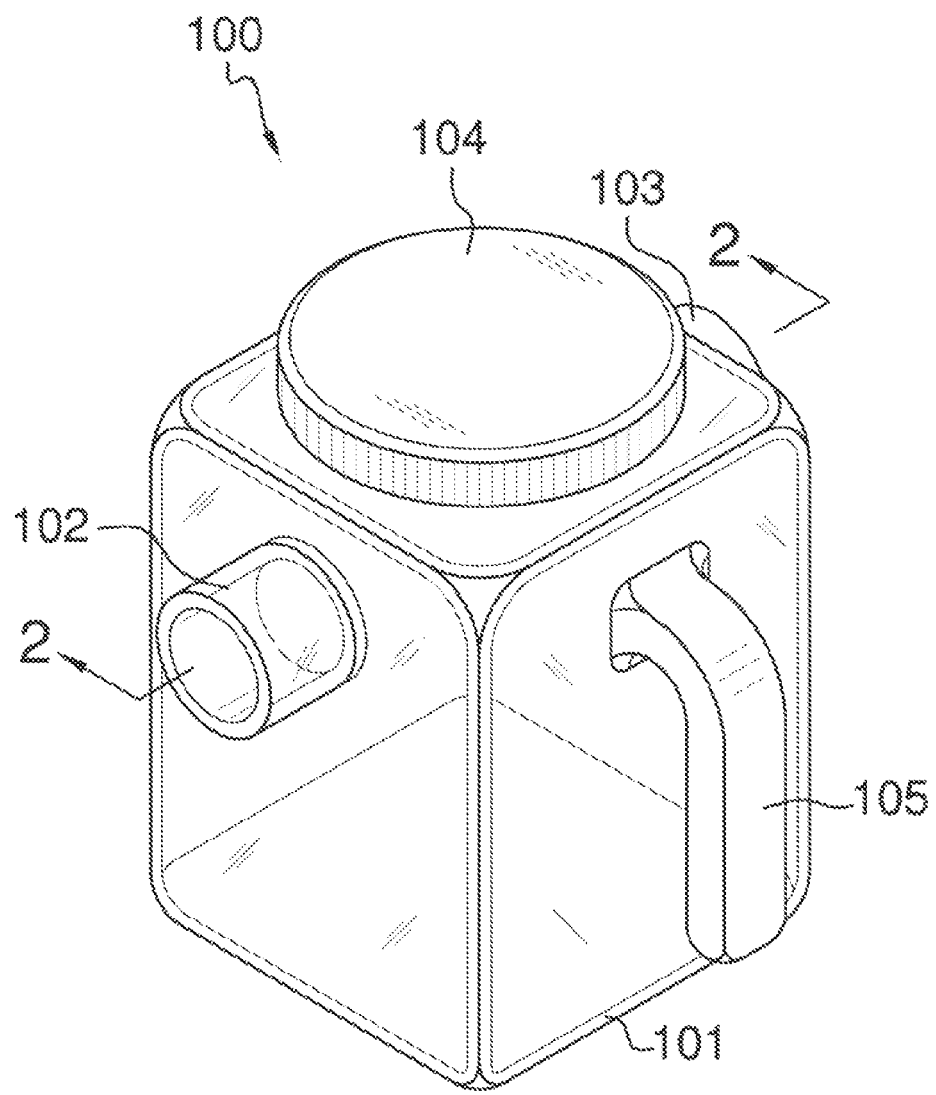
FIG. 1 illustrates a perspective view of the vacuum-based pest capture container by itself.
Figure 2:
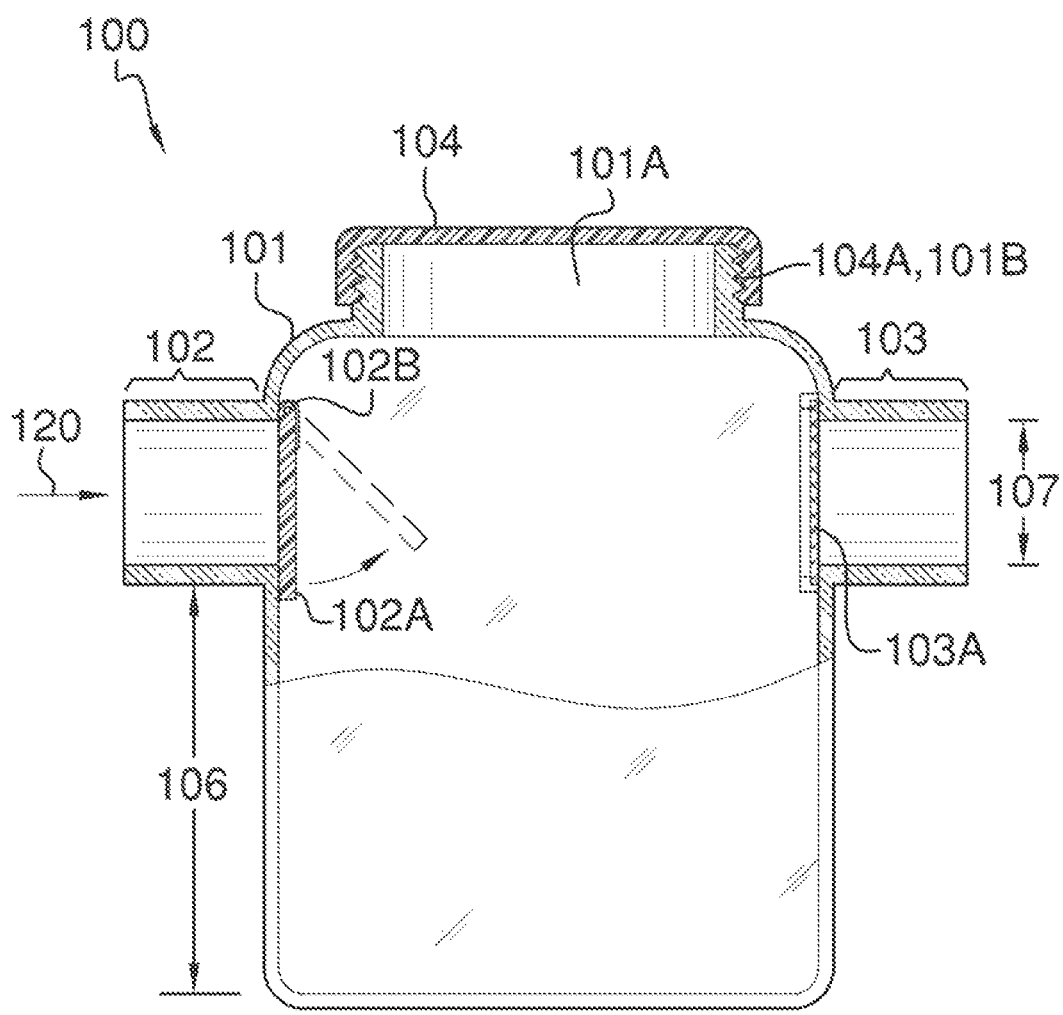
FIG. 2 illustrates a cross-sectional view of the vacuum-based pest capture container along line 2-2 in FIG. 1, and detailing the rotational movement of the one-way flap upon reaction to the vacuum force as depicted by a horizontal arrow, and further detailing the construction of the fixed screen at the outlet as well as the removable lid.
Figure 3:
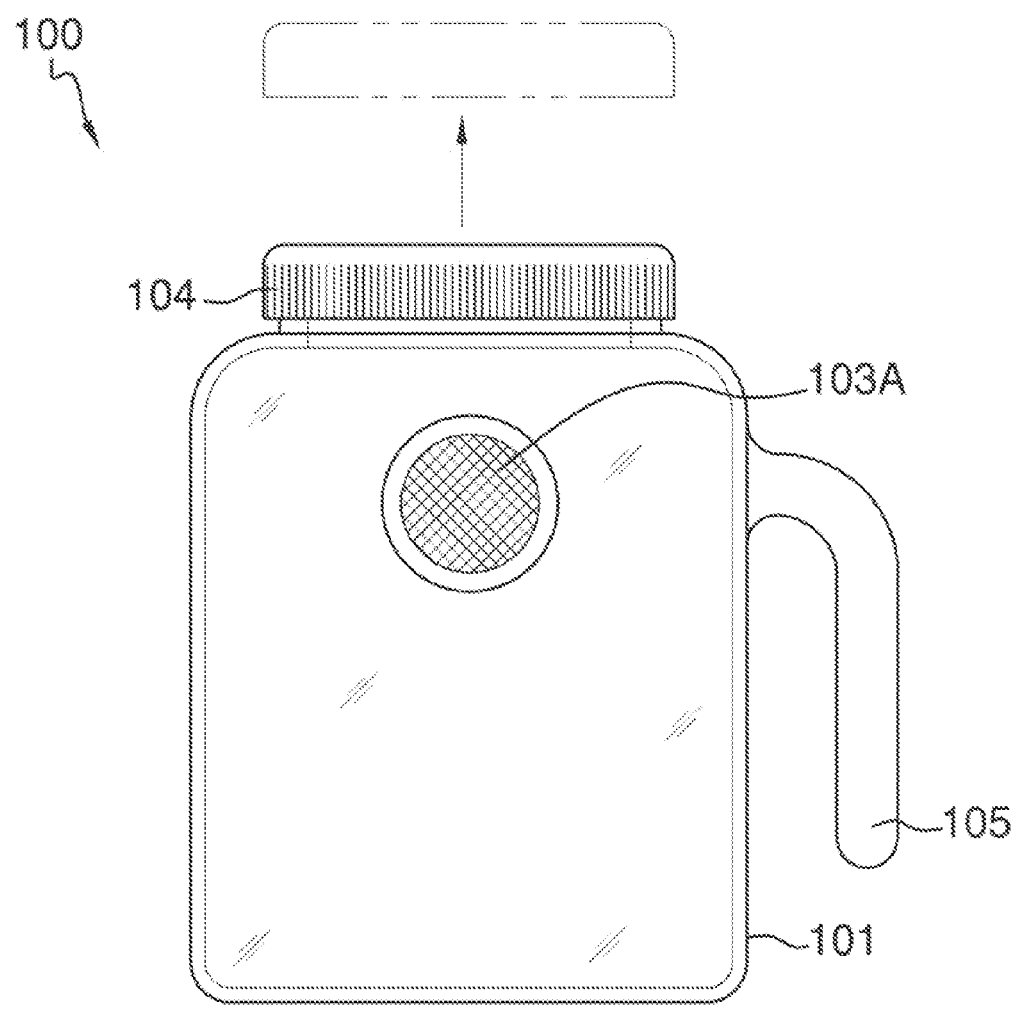
FIG. 3 illustrates an end view of the vacuum-based pest capture container in which the removable lid is removed while further detailing both the handle and the fixed screen at the outlet.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-4. A vacuum-based pest capture container 100 (hereinafter invention) includes a container 101 having an inlet 102, an outlet 103, a removable lid 104, and a handle 105.

Figure 4:
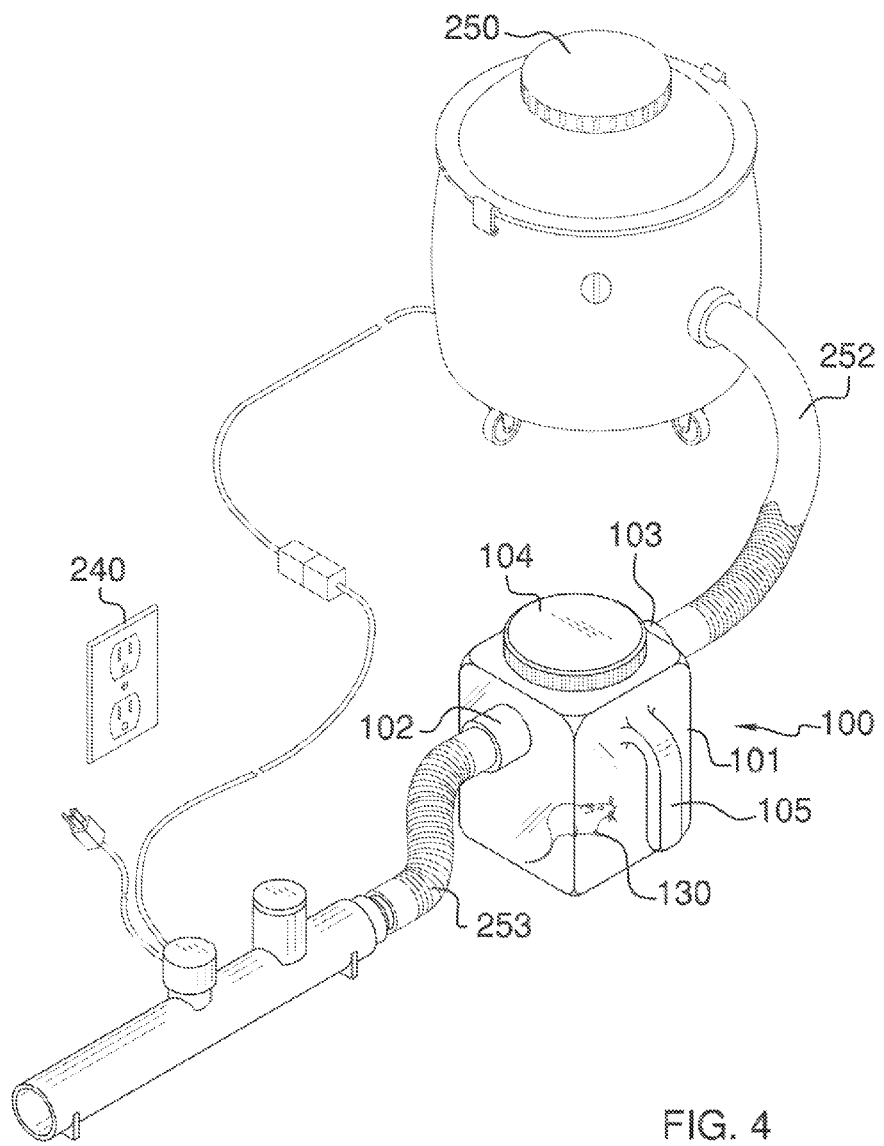
FIG. 4 illustrates a perspective view of the vacuum-based pest capture container in which a mouse is captured within the container, which is in-line between the vacuum cleaner hose and the automated vacuum-based pest control system.
Figure 5:
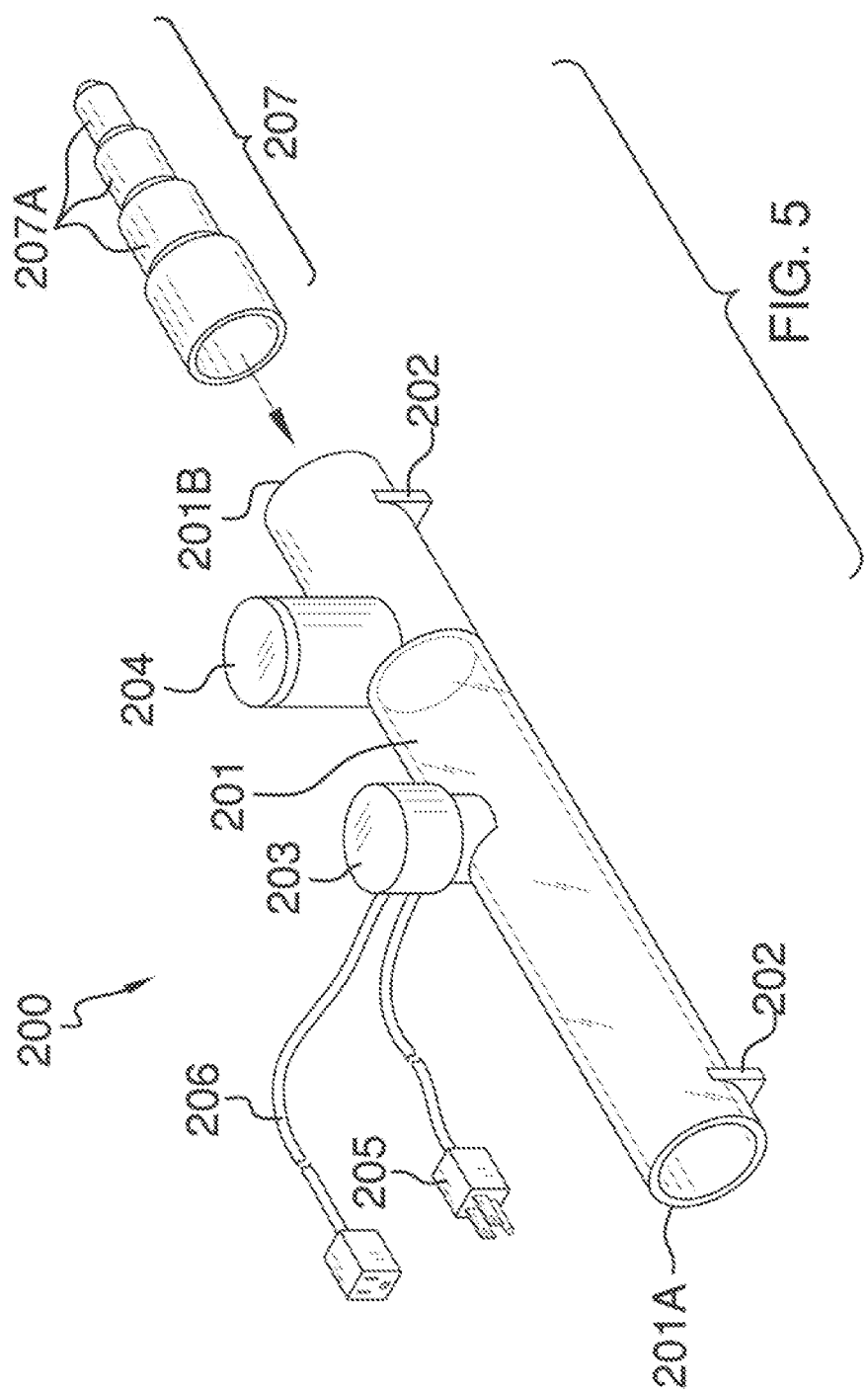
FIG. 5 illustrates a perspective view of the automated vacuum-based pest control system with an hose adapter and vacuum hose aligned adjacent the second entrance to the tube.
Figure 6:
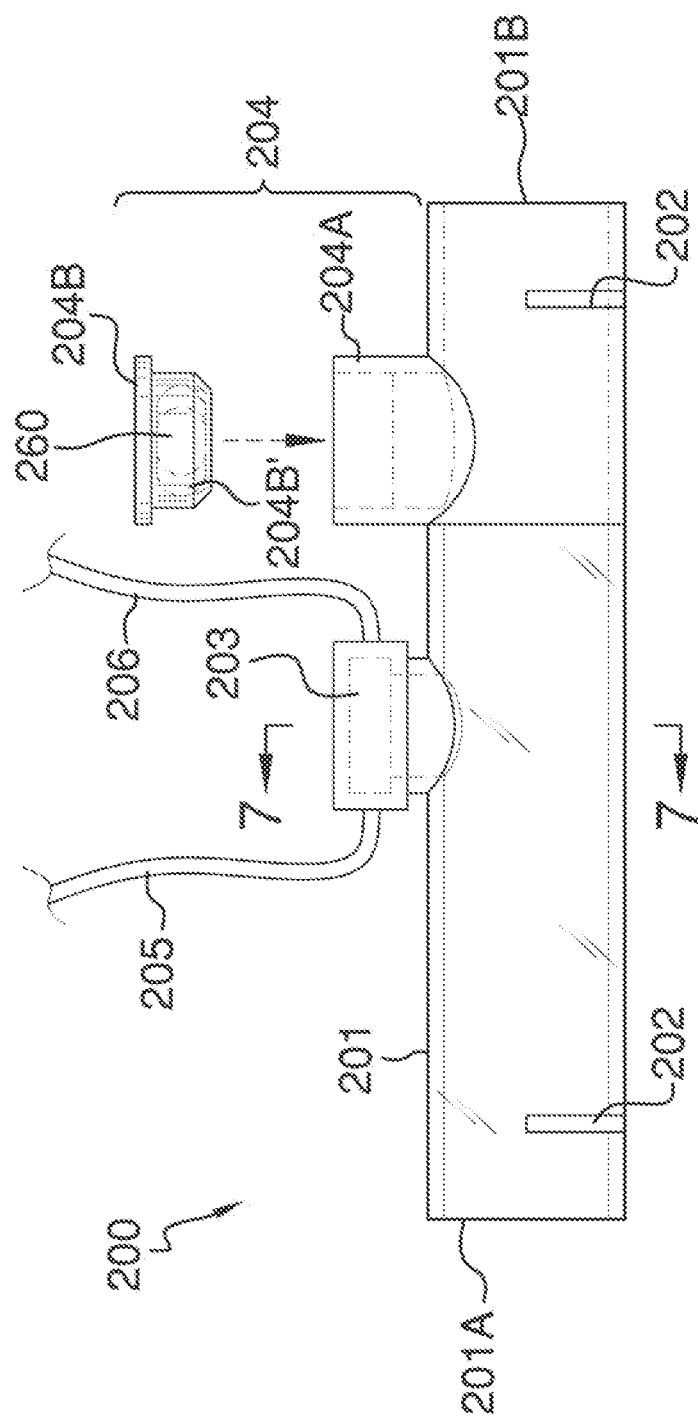
FIG. 6 illustrates a side view of the automated vacuum-based pest control system by itself and in which the bait tube cap is aligned above the bait tube in order to illustrate the accessibility of the baiting means.
Figure 7:
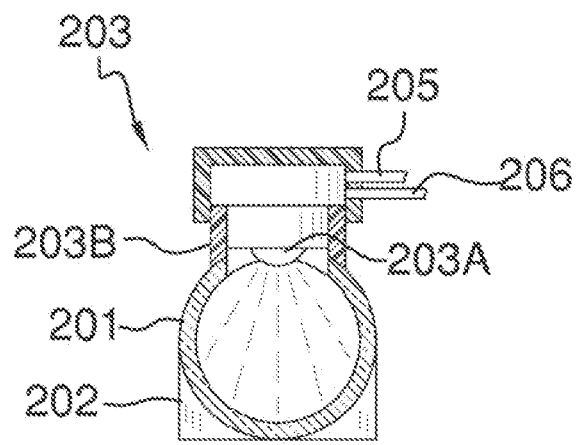
FIG. 7 illustrates a cross-sectional view of the automated vacuum-based pest control system along line 7-7 in FIG. 6, and depicting the sensing means in use as illustrated by lines radiating from a top, interior portion of said tube, while providing further detail surrounding the applicable plugs that extend from the sensing means.
Figure 8:
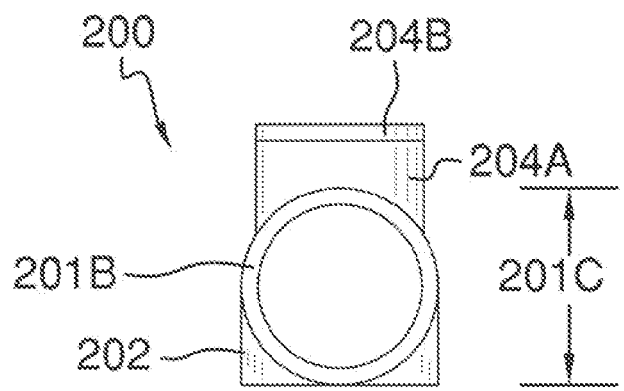
FIG. 8 illustrates a rear end view of the automated vacuum-based pest control system wherein the bait tube cap is installed onto the bait tube, which is perpendicularly oriented with respect to the tube while further detailing the stabilizer feet used to support the tube.
Figure 9:
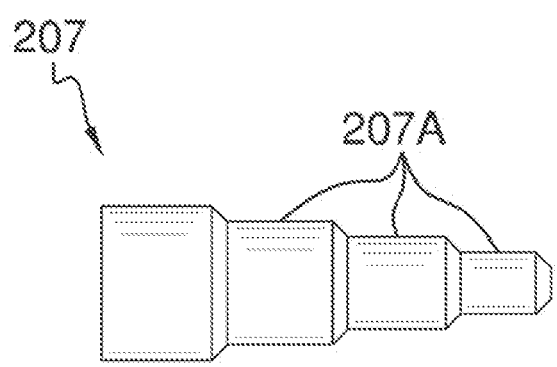
FIG. 9 illustrates a view of the hose adaptor, which may be used to attach the tube to a plurality of hose sizes, and which enables use with a plurality of vacuum cleaners.

The container 101 is of clear construction such that the contents are visible within the container 101 (see FIG. 4 depicting a mouse 230 located therein).

The container 101 includes a top opening 101A upon which the removable lid 104 attaches thereon. The attachable lid 104 enables access to the interior of the container 101 via the top opening 101A. The removable lid 104 includes internal threading 104A correlative to external threading 101B located on the top opening 101A such that the removable lid 104 screws' onto the container 101.

The inlet 102 is distally opposite the outlet 103. Both the inlet 102 and the outlet 103 are located at a height 106 along the container 101. The height 106 is pre-defined, and enables the pest 130 to fall downwardly into the container 101.

The inlet 102 includes a one-way flap 102A, which is attached via a hinge 102B along an interior surface of the container 101. The one-way flap 102A rests at a downward orientation via the hinge 102B, which may be spring-loaded. The one-way flap 102A is capable of rotational movement with respect to the inlet 102 upon the presence of a vacuum force 120 created by a vacuum cleaner 250. The vacuum force 120 draws air inwardly into the container 101 such that the one-way flap 102 rotates inwardly in order to enable access into the container 101 via the inlet 102.

The outlet 103 includes a fixed screen 103A located on an interior surface of the container 101 adjacent the outlet 103. The fixed screen 103A insures that the pest 130 trapped inside of the invention 100 is not sucked through the container 101 before passing up to the vacuum cleaner 150 located downstream.

The invention 100 is connected in-line between an automated vacuum-based pest control system 200 (hereinafter pest control system) and a vacuum hose 252 of the vacuum cleaner 250. The invention 100 is designed to capture the pest 130 inside of the container 101 upon detection by the vacuum-based pest control system 200 and the subsequent operation of the vacuum cleaner 250.

Both the inlet 102 and the outlet 103 shall have an inner diameter 107 that is consistent with respect to one another. The inner diameter 107 shall enable connection of the outlet 103 to the vacuum hose 252. Conversely, the inner diameter 107 of the inlet 102 shall enable connection with a second hose 253.

Referring to FIGS. 5-9, the automated vacuum-based pest control system 200 includes a tube 201, which is of an unspecified length, and further defined by a first entrance 201A and a second entrance 201B. The tube 201 may be completely or mostly composed of a clear material. The tube 201 shall have an internal diameter 201C that shall range from no less than 1 inch to not more than 4 inches.

The tube 201 includes at least one stabilizer foot 202 that adorn a bottom, exterior surface, and which enable the tube 201 to be supported on a flat ground surface. It shall be noted that the stabilizer foot 202 prevents unwanted rolling or movement of the tube 201 when in use.

Located nearer the first entrance 201A is a sensing means 203; whereas located nearer the second entrance 201B is a baiting means 204. It shall be noted that the term "nearer" is being used to refer to a location along the length of the tube 201. When traveling down the tube 201 from the first entrance 201A, the sensing means 203 is encountered before the baiting means 204.

The sensing means 203 includes a sensor 203A that is located along a top, interior surface of the tube 201, and which is housed within a sensing means tube 203B. The sensing means housing 203B is perpendicularly-adjoined to the tube 201. The sensor 203A may be of a type comprising a motion-based sensor or a thermal-based sensor. The sensor 203A shall either detect the presence of a pest 130 either by motion or by the heat signature of the pest 130.

The sensor 203A is in wired connection with a first plug 205 that is of an undefined length, and which can plug into a standard wall outlet 240. The sensor 203A is both powered via the first plug 205 and controls electricity to a second plug 206. The second plug 206 is also of an undefined length and features a female-styled plug, which can be plugged with a vacuum cleaner 250. Referring to FIG. 4, the vacuum cleaner 250 includes a power cord 251, which simply plugs into the second plug 206.

It shall be noted that the vacuum cleaner 250 is depicted as a shop-vac styled vacuum cleaner. However, it shall be noted that the vacuum cleaner 250 may be of different styles. It shall be further noted that vacuum cleaners come in different sizes employing motors of different strengths, as is usually defined by the amperage. The vacuum cleaner 250 includes the vacuum hose 252. The vacuum hose 252 may involve different sizes that correspond with the different sized vacuum cleaners that are currently available on the market.

The pest control system 200 includes a hose adapter 207 that can attach to the second entrance 201E of the tube 201. The hose adapter 207 features a plurality of steps 207A having progressively smaller diameters, which may enable attachment of the second hose 253 to the second entrance 201B of the tube 201 as needed. In the even that the adaptor 207 is not needed, the second hose 253 shall connect directly to the second entrance 201B of the tube 201 in order to provide fluid communication from the pest control system 200 to the invention 100, and to the vacuum cleaner 250.

The baiting means 204 includes a baiting means tube 204A, which is perpendicularly adjoined to a top surface of the housing 201. The baiting means tube 204A is enclosed via a bait tube cap 204B. The bait tube cap 204B includes a hollow recess 204B', which provides a location into which a bait 260 may be placed. It shall be noted that the bait 260 is ideally a peanut butter that is simply spread across the interior of the hollow recess 204B', and which attracts the pest 230 into the tube 201.

In order to use the pest control system 200 with the invention 100, the vacuum cleaner 250 is turned to an on position, and then plugged into the second plug 206. The bait 260 is placed in the bait tube cap 204B, which is then placed onto the baiting means tube 204A. Next, the first plug 205 is plugged into the standard wall outlet 240, and the pest control system 200 is set to catch the pest 230 upon detection via the sensing means 203.

It shall be noted that the sensor 203A may include a timer function, which turns on the power to the vacuum cleaner 250 for a defined amount of time via the second plug 206, and then subsequently turns off said power. The inclusion of the timer function insures that the pest control system 200 may be used indefinitely.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vacuum-based pest capture container system comprising:
   a container is in fluid communication with an automated vacuum-based pest control system; said container is also adaptively in fluid communication with a vacuum hose of an existing vacuum cleaner;
   said existing vacuum cleaner is controlled via the automated vacuum-pest control system;
   wherein upon detection of a pest via the automated vacuum-based pest control system, the vacuum cleaner is turned on in order to draw said pest into said container for capture;
   wherein the automated vacuum-based pest control system is further defined with a tube including a sensing means and a baiting means;
   wherein the vacuum hose of the existing vacuum cleaner is connected to the tube and operated upon detection of said pest within the tube via the sensing means;

wherein the sensing means includes a sensor that is located along a top, interior surface of the tube, and which is housed within a sensing means tube;

wherein the sensor is of a type comprising a motion-based sensor or a thermal-based sensor;

wherein the sensor is in wired connection with a first plug that is of an undefined length, and which can plug into a standard wall outlet; wherein the sensor is both powered via the first plug and controls electricity to a second plug; wherein the second plug is also of an undefined length and features a female-styled plug, which can be plugged with a power cord of the vacuum cleaner; wherein the vacuum cleaner is turned to an on setting and is operated once the sensor detects said pest;

wherein the sensor includes a timer function, which turns on the power to the vacuum cleaner for a defined amount of time via the second plug, and then subsequently turns off said power.

2. The vacuum-based pest capture container system as described in claim 1 wherein the container includes an inlet and an outlet that are both distally opposite of one another; wherein the inlet is in fluid communication with the automated vacuum-based pest control system via a second hose; wherein the outlet is in fluid communication with the vacuum cleaner via the vacuum hose.

3. The vacuum-based pest capture container system as described in claim 2 wherein the container includes a top opening having external threading for securement of a removable lid having internal threading correlative.

4. The vacuum-based pest capture container system as described in claim 2 wherein the container includes a handle for manipulation of the container between uses with the second hose and the automated vacuum-based pest control system.

5. The vacuum-based pest capture container system as described in claim 2 wherein the inlet includes a one-way flap attached to an interior of the container via a hinge; wherein the one-way flap opens inwardly in reaction to a vacuum force generated via the vacuum cleaner.

6. The vacuum-based pest capture container system as described in claim 5 wherein the hinge is spring-loaded such that the one-way flap rests downwardly in order to close off the inlet.

7. The vacuum-based pest capture container system as described in claim 2 wherein the outlet includes a fixed screen along an interior surface of the container.

8. The vacuum-based pest capture container system as described in claim 2 wherein the inlet and the outlet both have an internal diameter for attachment of the second hose and the vacuum hose, respectively.

9. The vacuum-based pest capture container system as described in claim 2 wherein the inlet and the outlet are both at a height along the container.

10. The vacuum-based pest capture container system as described in claim 1 wherein the container is of clear construction.

11. A vacuum-based pest capture container system comprising:

a container is in fluid communication with an automated vacuum-based pest control system; said container is also adaptively in fluid communication with a vacuum hose of an existing vacuum cleaner;

said existing vacuum cleaner is controlled via the automated vacuum-based pest control system;

wherein upon detection of a pest via the automated-vacuum based pest control system, the vacuum cleaner is turned on in order to draw said pest into said container for capture;

wherein the container includes an inlet and an outlet that are both distally opposite of one another; wherein the inlet is in fluid communication with the automated vacuum-based pest control system via a second hose; wherein the outlet is in fluid communication with the vacuum cleaner via the vacuum hose;

wherein the automated vacuum-based pest control system is further defined with a tube including a sensing means and a baiting means;

wherein the vacuum hose of the existing vacuum cleaner is connected to the tube and operated upon detection of said pest within the tube via the sensing means;

wherein the sensing means includes a sensor that is located along a top, interior surface of the tube, and which is housed within a sensing means tube;

wherein the sensor is of a type comprising a motion-based sensor or a thermal-based sensor;

wherein the sensor is in wired connection with a first plug that is of an undefined length, and which can plug into a standard wall outlet; wherein the sensor is both powered via the first plug and controls electricity to a second plug; wherein the second plug is also of an undefined length and features a female-styled plug, which can be plugged with a power cord of the vacuum cleaner; wherein the vacuum cleaner is turned to an on setting and is operated once the sensor detects said pest;

wherein the sensor includes a timer function, which turns on the power to the vacuum cleaner for a defined amount of time via the second plug, and then subsequently turns off said power.

12. The vacuum-based pest capture container system as described in claim 11 wherein the container includes a top opening having external threading for securement of a removable lid having internal threading correlative.

13. The vacuum-based pest capture container system as described in claim 11 wherein the container includes a handle for manipulation of the container between uses with the second hose and the automated vacuum-based pest control system.

14. The vacuum-based pest capture container system as described in claim 11 wherein the inlet includes a one-way flap attached to an interior of the container via a hinge; wherein the one-way flap opens inwardly in reaction to a vacuum force generated via the vacuum cleaner.

15. The vacuum-based pest capture container system as described in claim 14 wherein the hinge is spring-loaded such that the one-way flap rests downwardly in order to close off the inlet.

16. The vacuum-based pest capture container system as described in claim 11 wherein the outlet includes a fixed screen along an interior surface of the container.

17. The vacuum-based pest capture container system as described in claim 11 wherein the inlet and the outlet both have an internal diameter for attachment of the second hose and the vacuum hose, respectively.

18. The vacuum-based pest capture container system as described in claim 11 wherein the container is of clear construction.

19. The vacuum-based pest capture container system as described in claim 11 wherein the inlet and the outlet are both at a height along the container.

* * * * *